(12) United States Patent
Nagy

(10) Patent No.: US 7,078,362 B2
(45) Date of Patent: Jul. 18, 2006

(54) CARBENE DONOR-MODIFIED ZIEGLER-NATTA CATALYSTS

(75) Inventor: Sandor Nagy, Naperville, IL (US)

(73) Assignee: Equistar Chemicals, LP, Houston, TX (US)

( * ) Notice: Subject to any disclaimer, the term of this patent is extended or adjusted under 35 U.S.C. 154(b) by 22 days.

(21) Appl. No.: 11/008,330

(22) Filed: Dec. 9, 2004

(65) Prior Publication Data

US 2006/0128558 A1  Jun. 15, 2006

(51) Int. Cl.
| | |
|---|---|
| *B01J 37/00* | (2006.01) |
| *B01J 31/00* | (2006.01) |
| *C08F 4/02* | (2006.01) |
| *C08F 4/60* | (2006.01) |
| *C08F 4/06* | (2006.01) |

(52) U.S. Cl. .................. 502/103; 502/123; 526/131
(58) Field of Classification Search ............. 502/123, 502/103; 526/131
See application file for complete search history.

(56) References Cited

U.S. PATENT DOCUMENTS

| 4,136,243 | A | 1/1979 | Appleyard et al. ......... 526/139 |
| 4,927,797 | A | 5/1990 | Ewen ......................... 502/127 |
| 5,968,865 | A | 10/1999 | Wilson et al. ............. 502/126 |
| 6,060,568 | A | 5/2000 | Cavell et al. ............... 526/131 |
| 6,121,473 | A * | 9/2000 | Schrock et al. ............. 556/57 |
| 6,228,792 | B1 | 5/2001 | Carney ....................... 502/123 |
| 6,436,864 | B1 | 8/2002 | Tagge ......................... 502/123 |
| 6,525,125 | B1 * | 2/2003 | Giardello et al. ........... 524/439 |
| 6,576,724 | B1 * | 6/2003 | Olivier-Bourbigou et al. ......................... 526/139 |
| 6,667,269 | B1 * | 12/2003 | Olivier-Bourbigou et al. ......................... 502/117 |
| 6,753,378 | B1 * | 6/2004 | Kojoh et al. ................ 525/7.4 |
| 6,794,534 | B1 * | 9/2004 | Grubbs et al. ............. 560/205 |
| 6,831,032 | B1 * | 12/2004 | Spaether ..................... 502/103 |
| 2004/0192664 | A1 * | 9/2004 | Kunz et al. ................ 514/184 |

OTHER PUBLICATIONS

G. Britovsek et al., *Angew, Chem. Int. Ed.* 38 (1999) 428.
V. Reimer et al., *Inorg. Chim. Acta* 345 (2003) 221.
H. Aihara et al., *Chem. Commun.* (2003) 2204.
M. Niehues et al., *J. Organometal. Chem.* 663 (2002) 192.
W. Kirmse, *Angew. Chem. Int. Ed.* 43 (2004) 1767.
N. Kuhn et al., *Inorg. Chim. Acta* 238 (1995) 179.
W. Herrmann, *Angew. Chem. Int. Ed.* 41 (2002) 1290.
M. Neihues, *Organometallics 21* (2002) 2905.

* cited by examiner

*Primary Examiner*—J. A. Lorengo
*Assistant Examiner*—Jennine Brown
(74) *Attorney, Agent, or Firm*—John Tyrell; Jonathan L. Schuchardt

(57) ABSTRACT

A modified Ziegler-Natta catalyst system comprising a titanium or vanadium compound, a magnesium compound, a carbene donor, and an aluminum compound is disclosed. The invention includes a process which comprises polymerizing an alpha-olefin in the presence of the carbene-modified Ziegler-Natta catalyst system. The carbene donor may be used as either an internal or external donor. The use of carbene donors in Ziegler-Natta catalyzed olefin polymerizations should improve catalyst activity and/or stereospecificity.

17 Claims, No Drawings

CARBENE DONOR-MODIFIED ZIEGLER-NATTA CATALYSTS

FIELD OF THE INVENTION

The invention relates to Ziegler-Natta catalyst systems modified by a carbene donor and olefin polymerization processes that use the modified catalyst systems.

BACKGROUND OF THE INVENTION

Interest in catalysis continues to grow in the polyolefin industry. While much attention has been paid to single-site catalysts (metallocene and non-metallocene), they typically require high levels of expensive activators such as methyl alumoxane or tetrakis(pentafluorophenyl)borate salts. Ziegler-Natta catalysts typically do not require high levels of these expensive activators and are a mainstay for polyolefin manufacture. Much research has been done since their inception and there are many types of Ziegler-Natta catalysts in commercial use.

To improve catalyst activity or, in the case of propylene and higher alpha-olefins, to improve stereospecificity, electron donors are often used in combination with Ziegler-Natta catalysts. Electron donors can act as Lewis bases. Because of the importance of electron donors, there has been a large amount of research on the choice of the electron donor and the method of use. A variety of electron donors have been disclosed (for example, see U.S. Pat. No. 4,136,243). Common electron donors include ethers and esters (for example, see U.S. Pat. No. 5,968,865), but many others have been used. For example, U.S. Pat. No. 4,927,797 discloses the use of silane donors such as methylcyclohexyldimethoxysilane and U.S. Pat. No. 6,228,792 discloses the use of 2,6-disubstituted pyridines as electron donors. Sometimes two or more electron donors are used. U.S. Pat. No. 6,436,864 refers to electron donors used in the formation of the Ziegler-Natta catalyst as "internal donors." Donors added during or immediately prior to the polymerization are referred to as "external electron donors" or "selectivity control agents."

Organometallic complexes that incorporate carbene ligands and their use to polymerize olefins have been described in a few references. For example, tridentate bisphenol ligands that incorporate an electron donor and have linked aryloxides bonded to the transition metal (*Angew. Chem., Int. Ed.* 38, (1999) 428 and *Inorg. Chim. Acta.* 345 (2003) 221) exhibit unique polymerization activity. A titanium complex containing a bis(aryloxido) ligand with a linked carbene moiety is also effective in ethylene polymerizations (*Chem. Commun.* (2003) 2204). This titanium complex is difficult to make and the single polymerization used ethylene and high levels (Al:Ti molar ratio=1000:1) of methyl alumoxane, the activator normally used with single-site catalysts. No magnesium compounds were used. U.S. Pat. No. 6,060,568 describes transition metal complexes that incorporate carbene ligands derived from phosphinimines. The carbene is not used as a donor, and expensive activators are needed.

Certain complexes of zirconium and hafnium compounds with carbenes have been studied for ethylene polymerization in the presence of alumoxanes in *J. Organometal. Chem.* 663 (2002) 192. A high level of methyl alumoxane (1.8 g) is used to make less than 3 g of polyethylene.

As property requirements for polyolefins continue to evolve, there is a need for new electron donors for systems that are efficient and do not require large amounts of an expensive activator. Despite the considerable research that has been done, apparently carbenes have not been considered as donors for Ziegler-Natta catalyst systems based upon a titanium or vanadium compound, a magnesium compound, and an aluminum compound.

SUMMARY OF THE INVENTION

The invention is a modified Ziegler-Natta catalyst system. The catalyst system comprises a titanium or vanadium compound, a magnesium compound, a carbene donor, and an aluminum compound. The aluminum compound is an alkylaluminum dihalide, a dialkylaluminum halide, or a trialkylaluminum. The invention includes a process which comprises polymerizing an alpha-olefin in the presence of the carbene-modified Ziegler-Natta catalyst system. The carbene donor may be used as either an internal or external donor. The use of carbene donors in Ziegler-Natta catalyzed olefin polymerizations should improve catalyst activity and/or stereospecificity.

DETAILED DESCRIPTION OF THE INVENTION

Modified Ziegler-Natta catalyst systems of the invention are made from a titanium or vanadium compound, a magnesium compound, a carbene donor, and an aluminum compound. By "Ziegler-Natta" catalysts, we do not mean to include metallocene or single-site catalysts, which typically feature at least one polymerization-stable, anionic ligand that is aromatic, as in a cyclopentadienyl system.

Preferred titanium compounds are titanium halides such as titanium tetrachloride or titanium trichloride and titanium tetraalkoxides such as titanium tetraisopropoxide or titanium tetrabutoxide. Titanium tetrachloride is more preferred. Preferred vanadium compounds are vanadium halides such as vanadium tetrachloride, vanadium oxyhalides such as vanadium oxytrichloride, and vanadium oxyalkoxides such as vanadium oxytripropoxide. Vanadium oxytrichloride and vanadium tetrachloride are more preferred. Mixtures of titanium and vanadium compounds can be used.

Preferred magnesium compounds are dialkyl magnesiums such as diethyl magnesium, dialkoxy magensiums such as diisopropoxy magnesium, and magnesium halides such as magnesium chloride. Magnesium chloride is more preferred.

The modified Ziegler-Natta catalyst system includes a carbene donor. Carbenes are neutral divalent derivatives of carbon. A carbene has two nonbonding electrons that allow it to act as a donor and modify a Ziegler-Natta catalyst. Preferably, the nonbonding electrons are spin-paired. This is often called "singlet carbene." While many carbenes are highly reactive short-lived unstable moieties, stable isolable carbenes are known. For examples of preferred carbenes and a discussion of their synthesis, see *Angew. Chem., Int. Ed.* 43, (2004) 1767; *Inorg. Chim. Acta* 238 (1995) 179; and *Angew. Chem., Int. Ed.* 41, (2002) 1290.

The carbene donor may be generated "in-situ" in the presence of the Ziegler-Natta catalyst. This is preferred when the carbene is unstable. Combination of the carbene donor with the Ziegler-Natta catalyst can impart stability. Preferably, the carbene donor is stable and can be prepared separately and then combined with the catalyst to prepare a modified Ziegler-Natta catalyst. In this case, the carbene is an "internal donor." Optionally, the carbene donor is prepared and added separately during or immediately prior to the polymerization; here, the carbene is an "external donor."

Preferably, the carbene donor is an aminocarbene, a phosphanylcarbene or a silylcarbene and more preferably an aminocarbene or a phosphanylcarbene because these can be readily prepared and have good stability.

Exemplary carbene donors useful in making the catalyst systems:

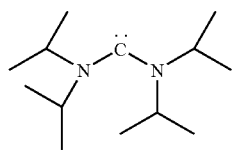
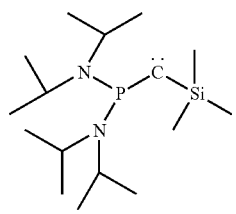
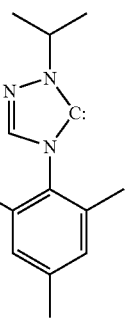
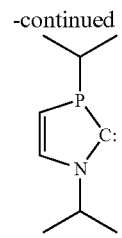
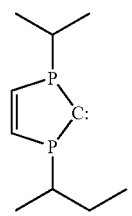

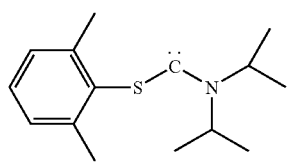

Also preferred are N-heterocyclic or P-heterocyclic carbenes. More preferably, the heterocyclic carbene has the general formula:

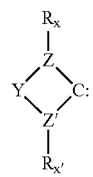

wherein Z is N or P; Z' is selected from the group consisting of N, P, S, O, and C; each R is independently selected from the group consisting of $C_1$–$C_{10}$ hydrocarbyl, amino substituted $C_1$–$C_{10}$ hydrocarbyl, and silyl; x is 0 or 1; x' is an integer from 0 to 2; and Y is a divalent linking group bonded to Z and Z' to form a five- to seven-membered heterocycle. Most preferably, Z and Z' are N and Y forms a five-membered heterocycle.

Exemplary heterocyclic carbene donors:

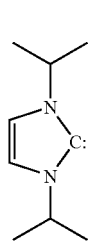
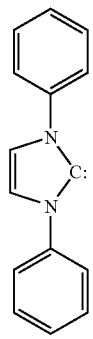
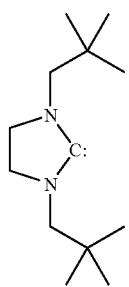

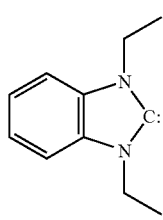
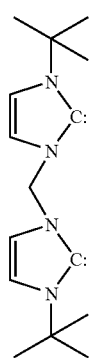
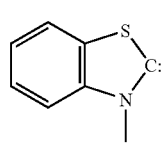

Preferably, the carbene donor is used at a level of from about 0.5 to about 10, more preferably from about 1 to about 5, and most preferably from about 1.5 to about 3 moles carbene per mole transition metal.

A fourth component of the modified Ziegler-Natta catalyst system is an aluminum compound. The aluminum compound is a trialkylaluminum (e.g., triethylaluminum, tri-isobutylaluminum, trimethylaluminum), a dialkyl-aluminum halide (e.g., diethylaluminum chloride or diisobutylaluminum bromide), or an alkylaluminum dihalide (e.g., ethylaluminum dichloride, isopropylaluminum dichloride). Preferably, the aluminum compound is a trialkylaluminum or a dialkylaluminum chloride.

The optimum amount of aluminum compound relative to the amount of other Ziegler-Natta catalyst components depends on many factors, including the nature of the catalyst and aluminum compound, the purity of the solvent, the desired reaction rate, the reaction conditions, and other factors. Generally, however, the amount used will be within the range of about 0.01 to about 100 moles, preferably from about 0.1 to about 50 moles, and more preferably from about 1 to about 5 moles, of aluminum per mole of transition metal.

The aluminum compound can be combined with other components of the catalyst system before its addition to the polymerization reactor. Preferably, however, the aluminum compound is added directly to the reactor separately from the rest of the catalyst system (see Examples 4–8, below).

The modified Ziegler-Natta catalyst system can be made by any suitable method; those skilled in the art will recognize a variety of acceptable synthetic strategies. In one preferred method, the carbene donor is prepared and then combined with a mixture of the titanium or vanadium compound and the magnesium compound (see Example 1, below). In another preferred method, the carbene donor is mixed with the magnesium compound and then the titanium or vanadium compound is added (see Example 2). In a third preferred method, the carbene donor is mixed with the titanium or vanadium compound and then the mixture is added to the magensium compound (see Example 3). Each of these methods uses an "internal" carbene donor.

The Ziegler-Natta catalyst may be also modified by a traditional electron donor such as an ester. When a traditional donor is also used, preferably the traditional donor, the magnesium compound and the titanium or vanadium compound are combined first. The combined catalyst is then added to the polymerization reactor, and the carbene is added separately, i.e., as an "external donor" (see Example 4, below).

The invention includes an olefin polymerization process. The process comprises polymerizing an alpha-olefin in the presence of the carbene-modified Ziegler-Natta catalyst system described above. By "polymerizing an alpha-olefin," we mean to include homopolymerizations as well as copolymerizations. Copolymers can be block, random, or alternating copolymers. Preferred alpha-olefins are ethylene, propylene, 1-butene, 1-hexene, 1-octene, and mixtures thereof. Propylene and combinations of propylene with a second olefin are more preferred.

In a preferred process of the invention, the alpha-olefin is polymerized in the presence of an "external" carbene donor. In this process the carbene donor is added directly to the reactor either during or immediately prior to the polymerization; it is not combined with the other components in advance to make the modified Ziegler-Natta catalyst system (see Example 4, below).

Optionally, hydrogen is used in the polymerization processes of the invention to regulate polyolefin molecular weight. The amount of hydrogen needed depends upon the desired polyolefin molecular weight and melt flow properties. Generally, as the amount of hydrogen is increased, the polyolefin molecular weight decreases and the melt index increases. For many applications, the polyolefin melt index will be too low if the polymerization is done in the absence of hydrogen. The process provides good control of molecular weight and melt flow properties by use of small amounts of hydrogen.

The polymerizations are normally conducted under pressure. The pressure is preferably in the range of about 0.5 MPa to about 35 MPa, more preferably from about 5 MPa to about 25 MPa.

Many types of polymerization processes can be used. The process can be practiced in the gas phase, bulk, solution, or slurry. The polymerization can be performed over a wide temperature range. Generally, lower temperatures give higher molecular weight and longer catalyst lifetimes. However, because the polymerization is exothermic, lower temperatures are more difficult and costly to achieve. A balance must be struck between these two factors. Preferably, the temperature is within the range of about 0° C. to about 150° C. A more preferred range is from about 20° C. to about 90° C.

Catalyst concentrations used for the olefin polymerizations depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Preparation of a Ziegler-Natta Catalyst with Titanium Tetrachloride, Magnesium Ethoxide, and a Carbene Donor

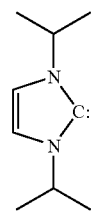

1

Titanium tetrachloride (100 g) is injected into a suspension of magnesium ethoxide (10 g) in 100 mL of toluene, and the temperature is raised to 90° C. The carbene, 1,3-diisopropylimidazol-2-ylidene, 1, prepared by the method described in *J. Organometal. Chem.* 663 (2002) 192 (0.01 mol) is then added, and stirring continues for 2 hours. The solid reaction product is filtered and washed with toluene (2×50 mL). The solids are suspended in 100 mL of fresh toluene and 5 g of titanium tetrachloride is added. The mixture is stirred for 2 hours at 110° C. The product is filtered, washed with hexane, and dried under vacuum. A solid catalyst is the expected product.

EXAMPLE 2

Preparation of a Ziegler-Natta Catalyst from Spherical Magnesium Chloride, Titanium Tetrachloride, and a Carbene Donor

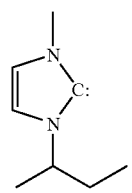

2

Magnesium chloride (30 g) and 1-methyl-3-isobutylimidazol-2-ylidene, 2, prepared by the method described in *J. Organometal. Chem.* 663 (2002) 192, (0.01 mol) are placed in a 1-liter steel ball-mill (fifty 25 mm balls) under nitrogen and rotated at room temperature for 30 hours. A portion of the product (10 g) is reacted with titanium tetrachloride (200 mL) at 50° C. for 2 hours. The product is filtered, washed with hexane, and vacuum dried. A solid catalyst is the expected product.

EXAMPLE 3

Preparation of a Ziegler-Natta Catalyst from Magnesium Chloride and a Titanium Tetrachloride/Carbene Donor Complex

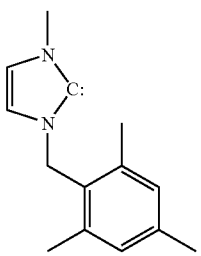

3

Titanium tetrachloride (0.1 mol) is added dropwise to a slurry of 1-methyl-3-(2,4,6-trimethylbenzyl)imidazol-2-ylidene, 3, prepared by the method described in *J. Organometal. Chem.* 663 (2002) 192 (0.1 mol) in 100 mL hexane at room temperature. After 3 hours of stirring at 40° C., the solid product is separated by filtration, washed with hexane, and vacuum dried. A portion of the product (2 g) is combined with ball-milled magnesium chloride (30 g) in a 1-liter steel ball-mill (fifty 25 mm balls) under nitrogen and rotated at room temperature for 30 hours. The product is washed with hexane and vacuum dried. A solid catalyst is the expected product.

EXAMPLE 4

Propylene Polymerization using an External Carbene Donor magnesium chloride (30 g) and diisobutyl phthalate (internal donor, 0.01 mol) are placed in a 1-liter steel ball-mill (fifty 25 mm balls) under nitrogen and rotated at room temperature for 30 hours. A portion of the product (10 g) is reacted with titanium tetrachloride (200 mL) at 50° C. for 2 hours. The product is filtered, washed with hexane, and vacuum dried to obtain a solid. 1,3-Diisopropylimidazol-2-ylidene, 1, (0.006 mol), triethylaluminum (0.002 mol) and the solid magnesium chloride/diisobutylphthalate/titanium tetrachloride solid prepared above are added sequentially to propylene (1000 g) in a 2-L reactor. After heating at 60° C. for 1 h, the reactor is vented to remove unreacted propylene. Polypropylene is the expected product.

EXAMPLE 5

Ethylene Copolymerization Using 4

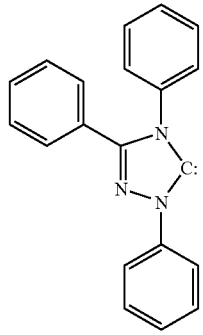

To a 1-L stainless-steel autoclave reactor, 85 mL of 1-hexene is added. Triisobutylaluminum (1.0 mL of 1.0 M solution in heptane, 1.0 mmol) is then flushed into the reactor with nitrogen pressure and isobutane (about 400 mL) and then pressurized with ethylene to 2.4 MPa. The reactor contents are allowed to equilibrate at 80° C. In a separate vessel, 0.5 g of anhydrous magnesium chloride is suspended in 4 mL of toluene. Titanium tetrachloride (0.38 g, 2.0 mmol) is added, and the mixture is heated with stirring for two hours at 80° C. The mixture is cooled to room temperature and 1.5 g (5 mmol) of 1,3,4-triphenyl-4,5-dihydro-1H-1,2,4-triazol-5-ylidene, 4, obtained from Acros Organics, is added. The mixture is stirred for 20 minutes at room temperature, loaded into an injector arm in a glovebox, and then flushed into the reactor with isobutane (100 mL) and nitrogen pressure. The polymerization proceeds at 80° C. for 30 minutes, and the reactor is then vented. An ethylene-hexene copolymer is the expected product.

EXAMPLE 6

Propylene Polymerization Using the Catalyst from Example 1

To a 1-L stainless-steel stirred reactor, at room temperature, is charged 400 mL of dry, oxygen-free propylene. Then 1.6 mL of a 25% by weight solution of triisobutylaluminum in heptane is flushed into the reactor with 50 mL of isobutane. The reactor is brought to 25° C. and allowed to equilibrate. Polymerization is begun by adding 0.2 mL of triethylaluminum followed by a mixture of 10 mL of heptane and 0.30 g of the solid catalyst prepared in Example 1. After 60 minutes at 25° C., the reactor is vented to remove isobutane and unreacted propylene. Polypropylene is the expected product.

EXAMPLE 7

Propylene Polymerization Using the Catalyst from Example 2

Example 6 is repeated using the solid catalyst prepared in Example 2. Polypropylene is the expected product.

EXAMPLE 8

Propylene Polymerization Using the Catalyst from Example 3

Example 6 is repeated using the solid catalyst prepared in Example 3. Polypropylene is the expected product.

I claim:

1. A modified Ziegler-Natta catalyst system comprising:
    a. a titanium compound, a vanadium compound, or a mixture thereof;
    b. a magnesium compound;
    c. a carbene donor; and
    d. an aluminum compound selected from the group consisting of alkylaluminum dihalides, dialkylaluminum halides, and trialkylaluminums.

2. The catalyst system of claim 1 wherein the carbene donor is selected from the group consisting of aminocarbenes, phosphanylcarbenes, and silyl carbenes.

3. The catalyst system of claim 2 wherein the carbene donor is a N-heterocyclic or P-heterocyclic carbene.

4. The catalyst system of claim 3 wherein the carbene donor has the general formula:

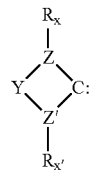

wherein Z is N or P; Z' is selected from the group consisting of N, P, S, O, and C; each R is independently selected from the group consisting of $C_1$–$C_{10}$ hydrocarbyl, amino-substituted $C_1$–$C_{10}$ hydrocarbyl, and silyl; x is 0 or 1; x' is an integer from 0 to 2; and Y is a divalent linking group bonded to Z and Z' to form a five- to seven-membered heterocycle.

5. The catalyst system of claim 4 wherein Z and Z' are N and Y forms a five-membered heterocycle.

6. The catalyst system of claim 1 wherein the titanium or vanadium compound is selected from the group consisting of titanium tetrachloride, vanadium oxychloride, vanadium tetrachloride, and mixtures thereof.

7. The catalyst system of claim 1 wherein the magnesium compound is magnesium chloride.

8. The catalyst system of claim 1 wherein the titanium or vanadium compound is first combined with the magnesium compound and then with the carbene donor.

9. The catalyst system of claim 1 wherein the titanium or vanadium compound is first combined with the carbene donor and then with the magnesium compound.

10. A process which comprises polymerizing an alpha-olefin in the presence of the catalyst system of claim 1.

11. The process of claim 10 wherein the alpha-olefin is selected from the group consisting of ethylene, propylene, 1-butene, 1-hexene, 1-octene, and mixtures thereof.

12. The process of claim 11 wherein the alpha-olefin is greater than 60 mole percent propylene.

13. The process of claim 10 wherein the ratio of the aluminum compound to the titanium or vanadium compound is from about 0.1 to about 50 moles of aluminum per mole of transition metal.

14. The process of claim 13 wherein the ratio of the aluminum compound to the titanium or vanadium compound is from about 1 to about 5 moles of aluminum per mole of transition metal.

15. The process of claim 10 wherein the aluminum compound is added to a polymerization reactor separately from the other catalyst system components.

16. The process of claim 10 wherein the carbene donor is used as an internal donor.

17. The process of claim 10 wherein the carbene donor is used as an external donor.

* * * * *